United States Patent
Kawano et al.

(10) Patent No.: US 8,424,953 B2
(45) Date of Patent: Apr. 23, 2013

(54) VEHICLE DOOR FRAME STRUCTURE

(75) Inventors: Masanori Kawano, Kariya (JP);
Hiroaki Yamasaki, Toyota (JP);
Kentaro Nishikawa, Kariya (JP);
Masaru Toyota, Toyota (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 42 days.

(21) Appl. No.: 12/998,094

(22) PCT Filed: Oct. 23, 2009

(86) PCT No.: PCT/JP2009/068262
§ 371 (c)(1),
(2), (4) Date: Mar. 17, 2011

(87) PCT Pub. No.: WO2010/053016
PCT Pub. Date: May 14, 2010

(65) Prior Publication Data
US 2011/0198882 A1    Aug. 18, 2011

(30) Foreign Application Priority Data
Nov. 4, 2008 (JP) .................................. 2008-283202

(51) Int. Cl.
*B62D 25/04* (2006.01)
*B60J 10/08* (2006.01)

(52) U.S. Cl.
USPC ...................................... 296/146.5; 49/475.1

(58) Field of Classification Search ................ 296/146.1, 296/146.2, 146.3, 146.5, 146.7, 146.9, 147; 49/502, 475.1
See application file for complete search history.

(56) References Cited

U.S. PATENT DOCUMENTS

| 6,416,113 B1 | 7/2002 | Page | |
| 6,986,528 B2 * | 1/2006 | Inoue et al. | 280/730.2 |
| 7,555,869 B2 * | 7/2009 | Inagaki et al. | 49/479.1 |

(Continued)

FOREIGN PATENT DOCUMENTS

| EP | 1 698 502 | 9/2006 |
| JP | 61-180812 | 11/1986 |

(Continued)

OTHER PUBLICATIONS

Extended European Search Report for EP Application No. 09824716.6 dated Mar. 21, 2012.

(Continued)

*Primary Examiner* — Lori Lyjak
(74) *Attorney, Agent, or Firm* — Finnegan, Henderson, Farabow, Garrett & Dunner, LLP

(57) ABSTRACT

A double-sided adhesive tape at a vehicle front-side is provided straddling from a first flange section to a second flange section so as to cover a vehicle width direction outer side end portion of a double-face contact portion. Accordingly, water is prevented from penetrating in from a vehicle width direction outer side end portion of the double-face contact portion. In other words, the double-sided adhesive tape doubles both as a joining member for fixing a garnish and as a waterproofing member for preventing water from penetrating in from the vehicle width direction outer side end portion of the double-face contact portion. Consequently, for example, provision of a waterproofing member such as a sealer or sponge can be dispensed with, and as a result a reduction in cost can be achieved.

7 Claims, 9 Drawing Sheets

U.S. PATENT DOCUMENTS

| | | | |
|---|---|---|---|
| 8,196,354 B2 * | 6/2012 | Ota | 49/441 |
| 2002/0036414 A1 * | 3/2002 | Nozaki et al. | 296/146.9 |
| 2004/0088925 A1 * | 5/2004 | Nozaki | 49/498.1 |
| 2004/0130179 A1 | 7/2004 | Masunaga et al. | |
| 2004/0137197 A1 * | 7/2004 | Watanabe | 428/122 |
| 2006/0107601 A1 * | 5/2006 | Inagaki et al. | 49/441 |
| 2007/0262608 A1 | 11/2007 | Saito | |

FOREIGN PATENT DOCUMENTS

| | | |
|---|---|---|
| JP | 5-16738 | 1/1993 |
| JP | 2004-142695 | 5/2004 |
| JP | 2005-145157 | 6/2005 |
| JP | 2006-88725 | 4/2006 |
| JP | 2007-62399 | 3/2007 |
| JP | 2007-302186 | 11/2007 |
| WO | WO 2008/123409 | 10/2008 |

OTHER PUBLICATIONS

International Search Report.
Notice of Reasons for Rejection for Japanese Appl. No. 2008-283202 dated Oct. 25, 2012.

\* cited by examiner

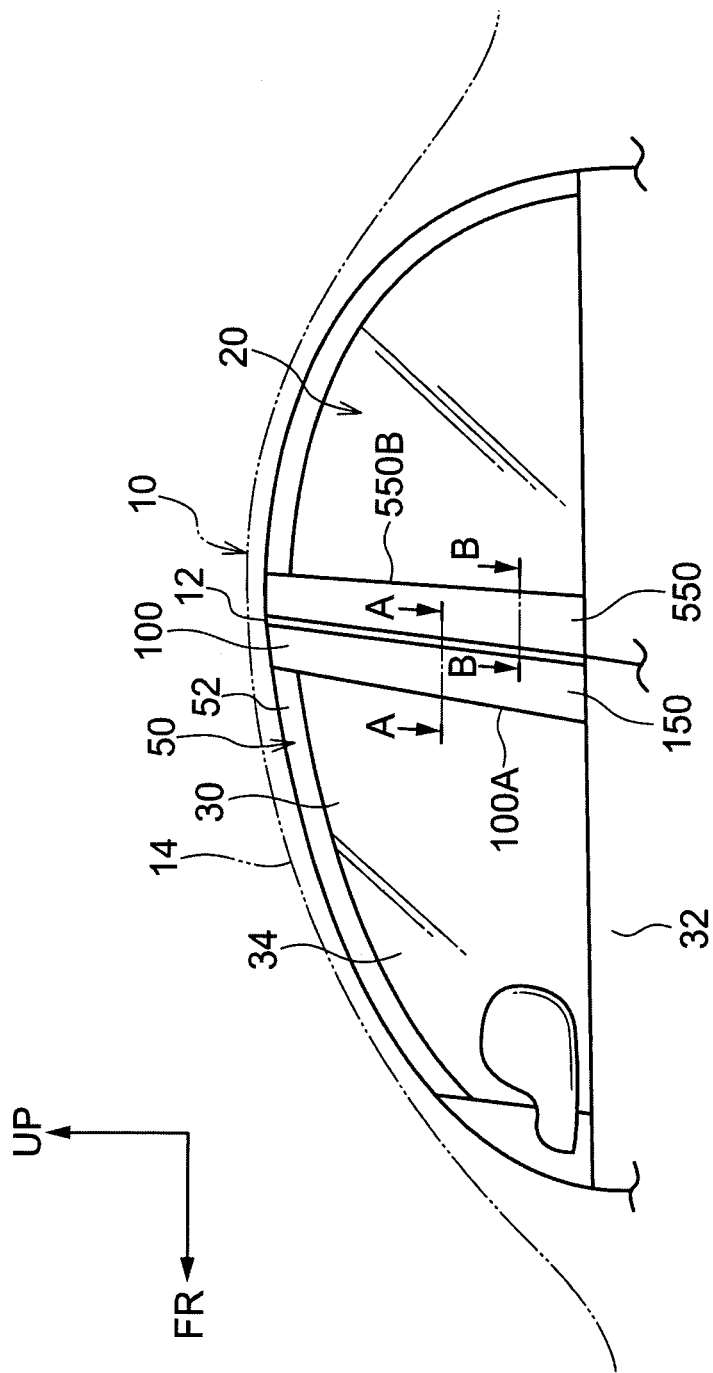

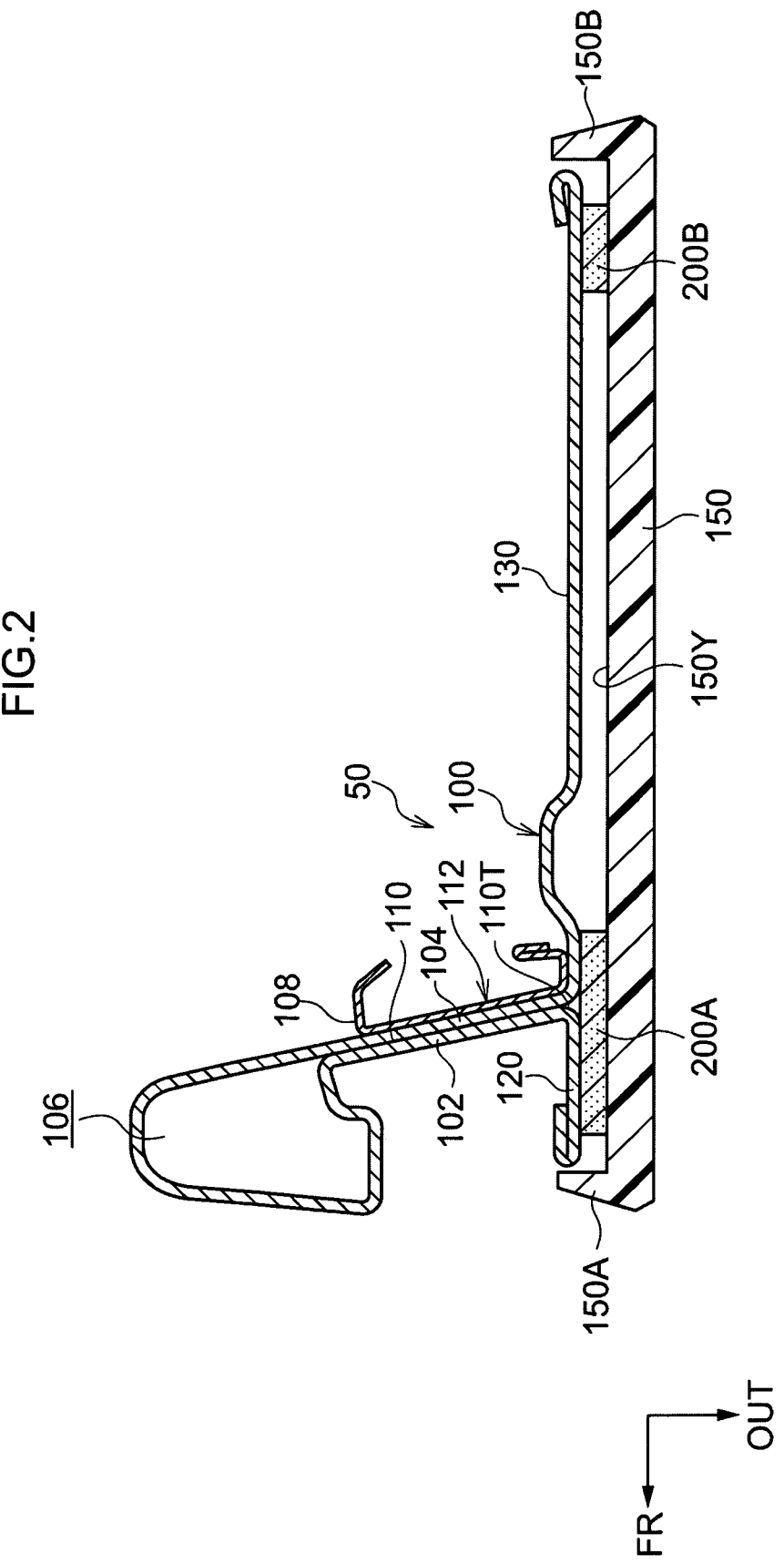

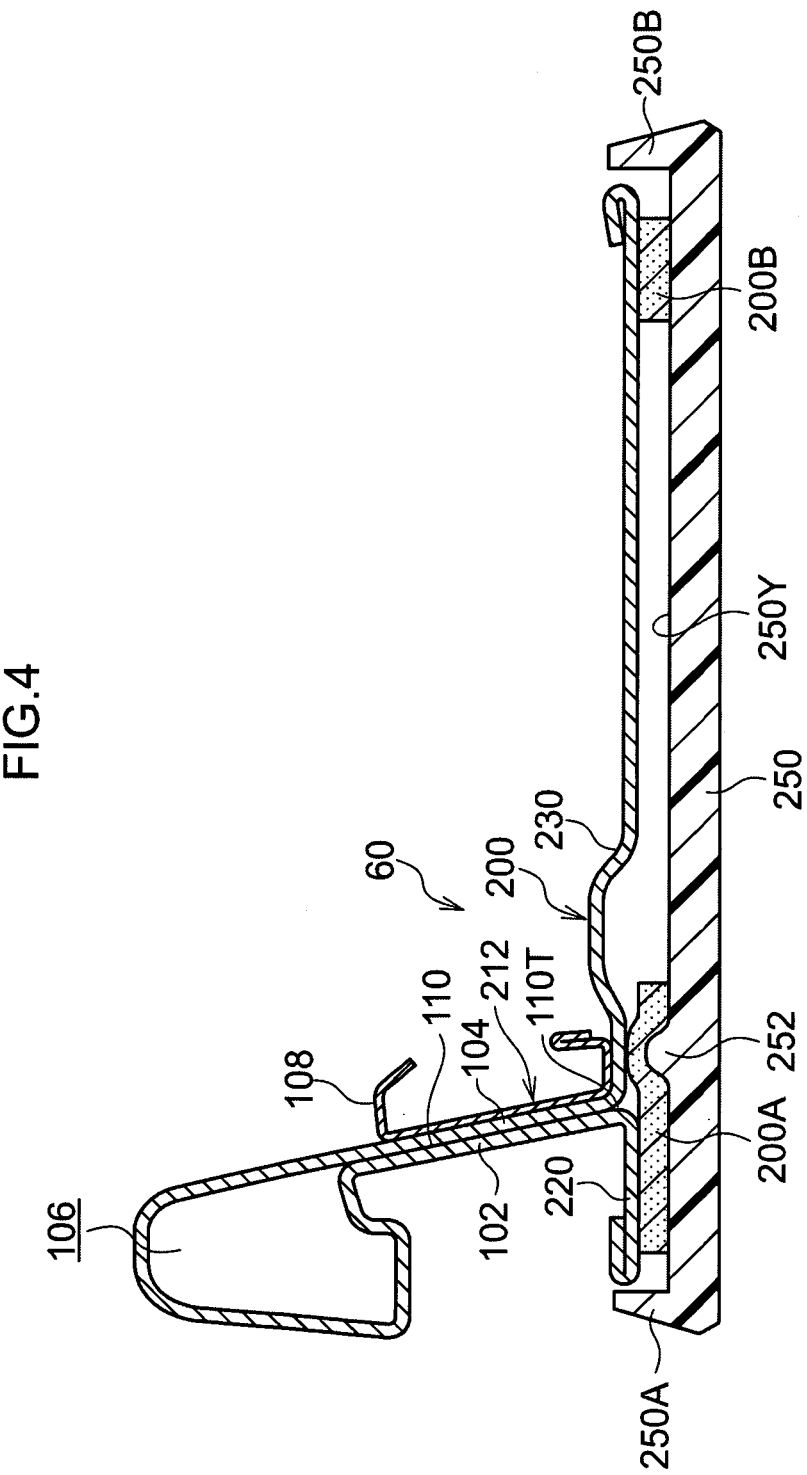

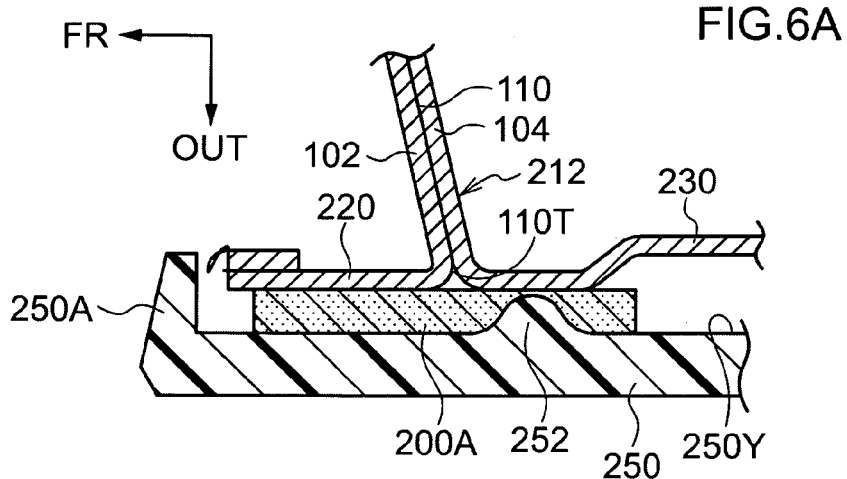
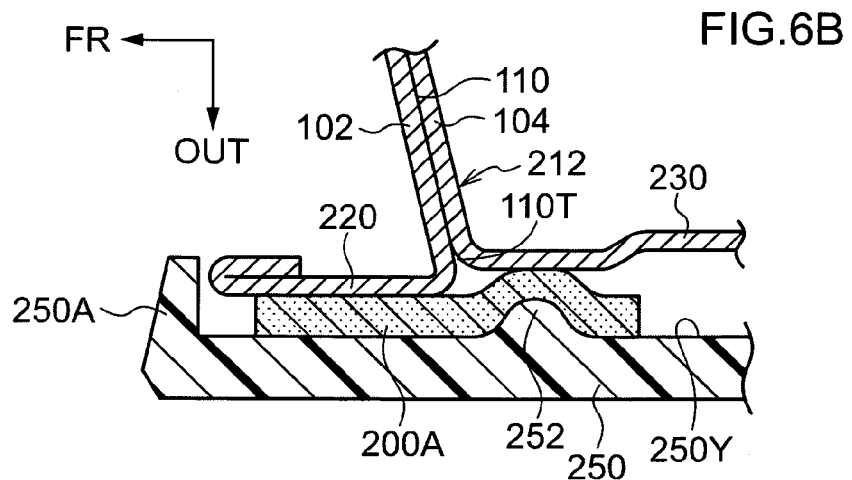
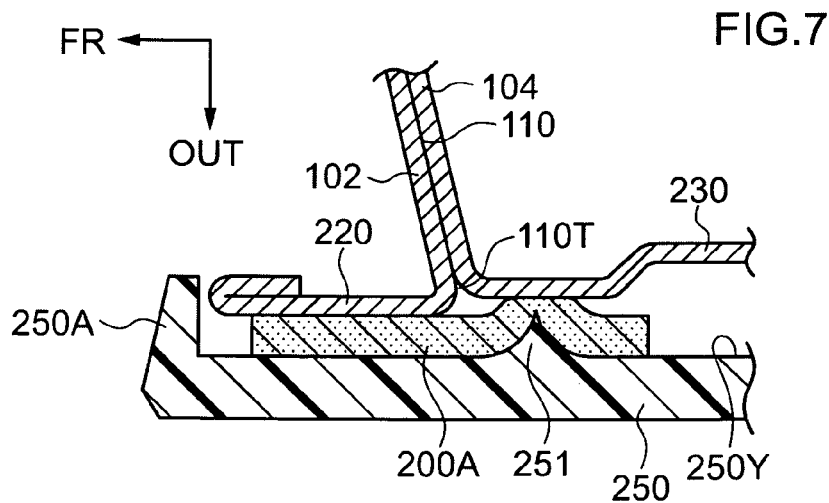

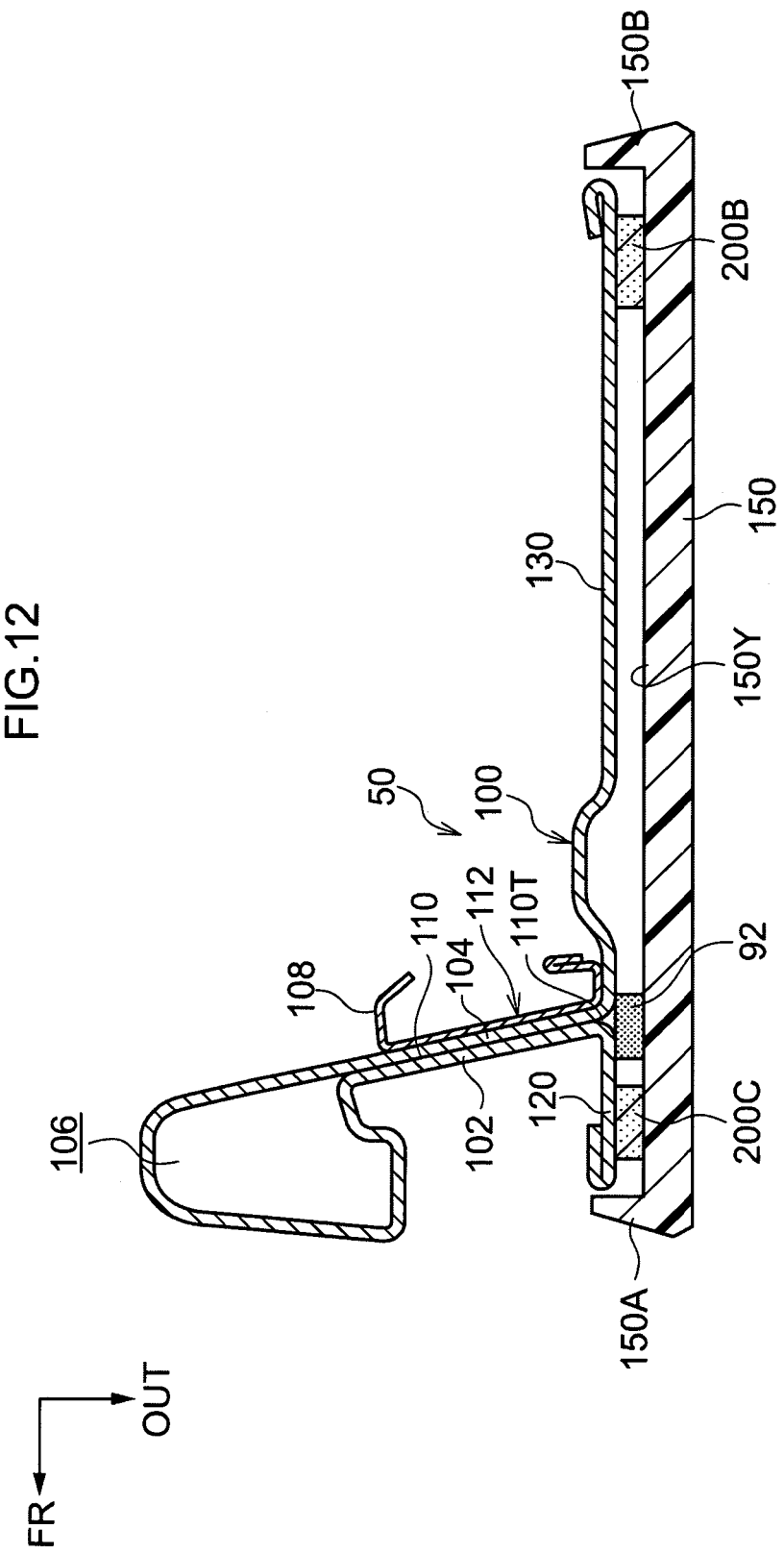

VEHICLE DOOR FRAME STRUCTURE

TECHNICAL FIELD

The present invention relates to a vehicle door frame structure.

RELATED ART

Configurations are known in which decorative garnish made from a resin is attached to a vehicle width direction outer side of a vehicle door frame, namely to an outer panel face side (a decorative face portion side) (see, for example, Japanese Patent Application Laid-Open No. 2006-88725).

DISCLOSURE OF THE INVENTION

Problem to be Solved by the Invention

Here, in cases in which the door frame is formed by rolling, as shown in FIG. 11 or FIG. 12, a closed-section portion 106 configured with a closed cross-section and a double-face contact portion 110 (see the bold line portion in FIG. 11) are formed. Usually antirust paint is not applied to the double-face contact portion (contact faces) 110. Accordingly, rust readily occurs when water penetrates in from a vehicle width direction outer side end portion 110T of the double-face contact portion 110 (see the portion encircled in the double-dot intermittent line in FIG. 11).

Water prevention measures therefore need to be taken, such as applying a sealer 90 to the vehicle width direction outer side end portion 110T of the double-face contact portion 110, as shown in FIG. 11, or adhering a sponge 92 thereto, as shown in FIG. 12.

The present invention is made in consideration of the above circumstances, and an object is to prevent water from penetrating in to the double-face contact portion in a door frame, without resorting to separate application of a waterproofing member, such as a sealer or sponge.

Method of Solving the Problem

A first aspect of the present invention includes: a door frame including a substantially T-shaped portion in plan view, the T-shaped portion comprising a double-face contact portion at which two vertical wall sections are in surface contact with each other, a first flange section extending towards a vehicle front-side from an edge portion of one of the vertical wall sections at the double-face contact portion, and a second flange section extending towards a vehicle rear-side from an edge portion of the other of the vertical wall sections at the double-face contact portion; a garnish provided at a vehicle width direction outer side of the first flange section and the second flange section of the door frame; and a joining member joining the garnish to the first flange section and the second flange section, the joining member disposed straddling the first flange section and the second flange section so as to cover a vehicle width direction outer side end portion of the double-face contact portion in side view.

Accordingly, water is prevented from penetrating in to the double-face contact portion since the joining member joining the garnish to the first flange section and the second flange section covers the vehicle width direction outer side end portion of the double-face contact portion. Namely, the joining member doubles as a waterproofing member, and so, for example, separates provision of a waterproofing member, such as a sealer or sponge, can be dispensed with.

In a second aspect, in an area provided with the joining member, a first protrusion portion is provided projecting towards a vehicle width direction inner side at least one of a portion of the garnish facing the first flange section or a portion of the garnish facing the second flange section.

Accordingly, the surface pressure of the joining member at the portion corresponding to the first protrusion portion is higher, and waterproofing performance is enhanced.

In a third aspect, the first flange section and the second flange section are disposed so as to be displaced with respect to each other in a vehicle width direction, and the first protrusion portion is provided at a portion of the garnish facing whichever of the first flange section or the second flange section is displaced toward the vehicle width direction inner side.

Accordingly, waterproofing performance is secured by the first protrusion portion even in a structure in which the first flange section and the second flange section are disposed so as to be displaced in the vehicle width direction.

Here, even when the maximum variation during manufacturing occurs, a structure is made in which a given flange section out of the first flange section and the second flange section is always disposed on the vehicle width direction inner side, and since the first protrusion portion is always provided at the flange section displaced toward the vehicle width direction inner side, the waterproofing performance is prevented from falling due to the first flange section or the second flange section displacing in the vehicle width direction due to variation during manufacture.

In a fourth aspect, in an area provided with the joining member, a second protrusion portion is provided projecting towards the vehicle width direction outer side at least one of the first flange section or the second flange section.

Accordingly, the surface pressure of the joining member at the portion corresponding to the second protrusion portion is higher, and waterproofing performance is enhanced.

In a fifth aspect, the first flange section and the second flange section are disposed so as to be displaced with respect to each other in a vehicle width direction, and the second protrusion portion is provided at whichever of the first flange section or the second flange section is disposed so as to be displaced toward the vehicle width direction inner side.

Accordingly, waterproofing performance is secured by the second protrusion portion even in a structure in which the first flange section and the second flange section are disposed so as to be displaced in the vehicle width direction.

Here, even when the maximum variation during manufacturing occurs, a structure is made in which a given flange section out of the first flange section and the second flange section is always disposed at the vehicle width direction inner side, and since the second protrusion portion is provided on the flange section displaced toward the vehicle width direction inner side, the waterproofing performance is prevented from falling due to the first flange section or the second flange section displacing in the vehicle width direction due to variation during manufacture.

In a sixth aspect, in the area provided with the joining member, whichever of the first flange or the second flange section is not adjacent to a vehicle front-side end portion or a vehicle rear-side end portion of the garnish is displaced toward the vehicle width direction inner side.

Accordingly, bonding surface area is secured since there is no first protrusion portion or second protrusion portion formed at the garnish and at whichever of the first flange section or the second flange section is adjacent to the vehicle front-side edge portion or the vehicle rear-side edge portion of the garnish. Hence bonding force is secured to join the vehicle front-side edge portion or the vehicle rear-side edge portion of the garnish.

In a seventh aspect, the joining member is double-sided adhesive tape formed with an adhesive layer on both faces of a base member.

Accordingly, water can be prevented from penetrating in to the double-face contact portion since the vehicle width direction outer side end portion of the double-face contact portion is covered by the double-sided adhesive tape.

Effect of the Invention

According to the invention of claim 1, water can be prevented from penetrating in to the double-face contact portion of the door frame without resorting to separate application of a waterproofing member, such as a sealer or sponge.

According to the invention of claim 2, waterproofing performance can be enhanced.

According to the invention of claim 3, waterproofing performance can be secured even in a structure in which the first flange section and the second flange section are disposed so as to be displaced in the vehicle width direction.

According to the invention of claim 4, waterproofing performance can be enhanced.

According to the invention of claim 5, waterproofing performance can be secured even in a structure in which the first flange section and the second flange section are disposed so as to be displaced in the vehicle width direction.

According to the invention of claim 6, both waterproofing performance and bonding force for joining the vehicle front-side edge portion or the vehicle rear-side edge portion of the garnish can be secured even in a structure in which the first flange section and the second flange section are disposed so as to be displaced in the vehicle width direction.

According to the invention of claim 7, the garnish can be easily joined and water can be easily prevented from penetrating into the double-face contact portion due to employing double-sided adhesive tape.

BRIEF DESCRIPTION OF THE DRAWINGS

FIG. 1 is a side view showing a door frame of a side door of a vehicle applied with a door frame structure of a first exemplary embodiment.

FIG. 2 is a horizontal cross-section taken along line IV-IV of FIG. 1.

FIG. 4 is horizontal cross-section of a vehicle door frame structure of a second exemplary embodiment of the present invention (a diagram corresponding to the horizontal cross-section of FIG. 2 taken along line IV-IV of FIG. 1 of the first exemplary embodiment).

FIG. 6A is a horizontal cross-section of relevant portions of the second exemplary embodiment showing a joined state in which a second flange section is displaced toward the vehicle width direction outer side due to variation during manufacture.

FIG. 6B is a horizontal cross-section of relevant portions of the second exemplary embodiment showing a joined state in which the second flange section is displaced toward the vehicle width direction inner side due to variation during manufacture.

FIG. 7 is a horizontal cross-section showing an example of another shape of protrusion portion.

FIG. 12 is a horizontal cross-section of a door frame structure in which water is prevented from penetrating a vehicle width direction end portion of a doubled face-contact portion by a sponge.

BEST MODE OF IMPLEMENTING THE INVENTION

Figure 3A:
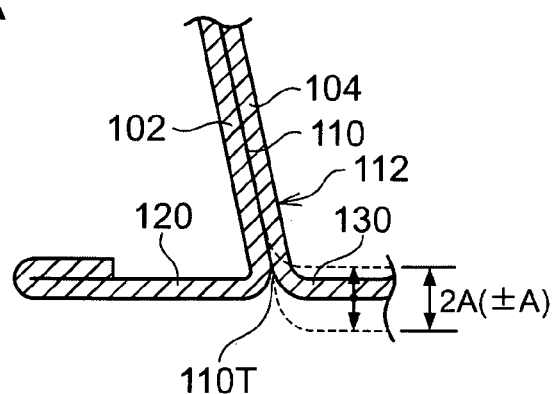
FIG. 3A is a horizontal cross-section of relevant portions of a substantially T-shaped portion in plan view showing a state in which a first flange section and a second flange section are positioned at their central designed positions.

Explanation follows regarding a first exemplary embodiment of a door frame structure of the present invention, with reference to FIG. 1 and FIG. 2. FIG. 1 is a side view showing a door frame of a side door of a vehicle applied with the door frame structure of the first exemplary embodiment. FIG. 2 is a horizontal cross-section taken along line IV-IV of FIG. 1. In the drawings arrow UP indicates the vehicle up direction, arrow FR indicates the vehicle front direction, arrow OUT indicates the outside direction in the width direction of the vehicle.

As shown in FIG. 1, a side portion of a vehicle 10 is disposed with: a front side door 30; a rear side door 20; and a center pillar (B pillar) 12 disposed between the front side door 30 and the rear side door 20 and extending along the vehicle top-bottom direction.

A door frame 50 is integrally joined to the front side door 30 of the vehicle 10 at an upper portion of a door body 32. The door frame 50 is equipped with: a roof-side framework portion 52 configuring a window frame for supporting side door glass 34 and having an upper edge portion disposed at a roof 14 side; and a pillar-side framework portion 100 (see FIG. 2) disposed at the center pillar 12 side. A decorative garnish 150 (see also FIG. 2) made from resin is attached at the vehicle width direction outer side of the pillar-side framework portion 100 of the door frame 50, namely on the outer panel side (decorative face portion side).

The roof-side framework portion 52 and the pillar-side framework portion 100 are formed by rolling, such as from sheet steel or the like.

As shown in FIG. 2, the pillar-side framework portion 100 of the door frame 50 is formed with a double-face contact portion 110 where a vertical wall portion 102 and a vertical wall portion 104 extending along the vehicle width direction are superimposed on each other and joined together. A closed-section portion 106 having a substantially rectangular shape in horizontal cross-section is formed at the vehicle width direction inner side (vehicle cabin inner side) of the double-face contact portion 110.

A first flange section 120 of vertical wall shape is formed at the pillar-side framework portion 100 of the door frame 50, extending towards the vehicle front from an edge portion of the vertical wall portion 102 to the vehicle front side. The first flange section 120 is folded back on itself to the vehicle width direction inner side in the vicinity of a vehicle front-side edge portion 150A of the garnish 150.

Similarly, a second flange section 130 of vertical wall shape is formed at the pillar-side framework portion 100 of the door frame 50, extending towards the vehicle rear-side from an edge portion of the vertical wall portion 104 to the vehicle front-side. The second flange section 130 is folded back on itself to the vehicle width direction inner side in the vicinity of a vehicle rear-side edge portion 150B of the garnish 150.

Accordingly, the pillar-side framework portion 100 includes: a substantially T-shaped portion 112 in plan view, configured by the double-face contact portion 110 where the vertical wall portion 102 and the vertical wall portion 104 are joined, the first flange section 120, and the second flange section 130; and the closed-section portion 106.

A channel 108, into which a door weather strip (not shown in the drawings) is fitted, is joined to the vertical wall portion 104.

A vehicle front-side portion and a vehicle rear-side portion of the garnish 150 are joined with double-sided adhesive tapes 200A, 200B to the first flange section 120 and the second flange section 130 configuring the pillar-side framework portion 100. The double-sided adhesive tapes 200A, 200B extend in the vehicle top-bottom direction from a top end portion to a bottom end portion of the garnish 150.

The double-sided adhesive tape 200B at the vehicle rear-side joins together the vehicle rear-side portion of the second flange section 130 and the garnish 150.

The double-sided adhesive tape 200A at the vehicle front-side is provided straddling from the first flange section 120 across to the vehicle front-side end portion of the second flange section 130, so as to cover a vehicle width direction outer side end portion 110T of the double-face contact portion 110 when viewed from the side (see FIG. 2).

In the present exemplary embodiment, the double-sided adhesive tapes 200A, B are first adhered to a back face (vehicle width direction inner side face) 150Y of the garnish 150, then joined to the first flange section 120 and the second flange section 130 so as to fix the garnish 150. Note that configuration may be made such that the double-sided adhesive tapes 200A, B is first attached to the first flange section 120 and the second flange section 130 configuring the pillar-side framework portion 100 of the door frame 50, and then the garnish 150 is joined to the first flange section 120 and the second flange section 130 so as to fix the garnish 150.

Figure 10:
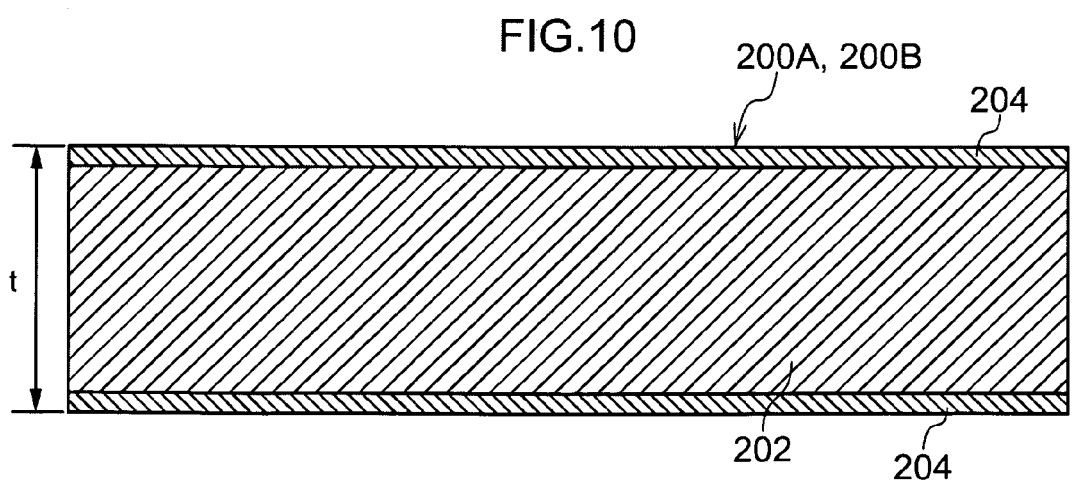
FIG. 10 is side view schematically showing a structure of a double-sided adhesive tape.

Furthermore, in the present exemplary embodiment, as shown in FIG. 10, the double-sided adhesive tapes 200A, B are configured with an adhesive layer 204 of an acrylic based adhesive formed on both faces of a base member 202 made from an acrylic foam material. The thickness of the double-sided adhesive tapes 200A, B is denoted t. Note that another configuration of double-sided adhesive tape may be employed. For example, configuration may be made with a base material of a butyl foam rubber.

Explanation now follows regarding operation of the present exemplary embodiment.

As shown in FIG. 2, the double-sided adhesive tape 200A at the vehicle front-side is provided straddling across from the first flange section 120 to the second flange section 130, so as to cover the vehicle width direction outer side end portion 110T of the double-face contact portion 110.

Figure 11:
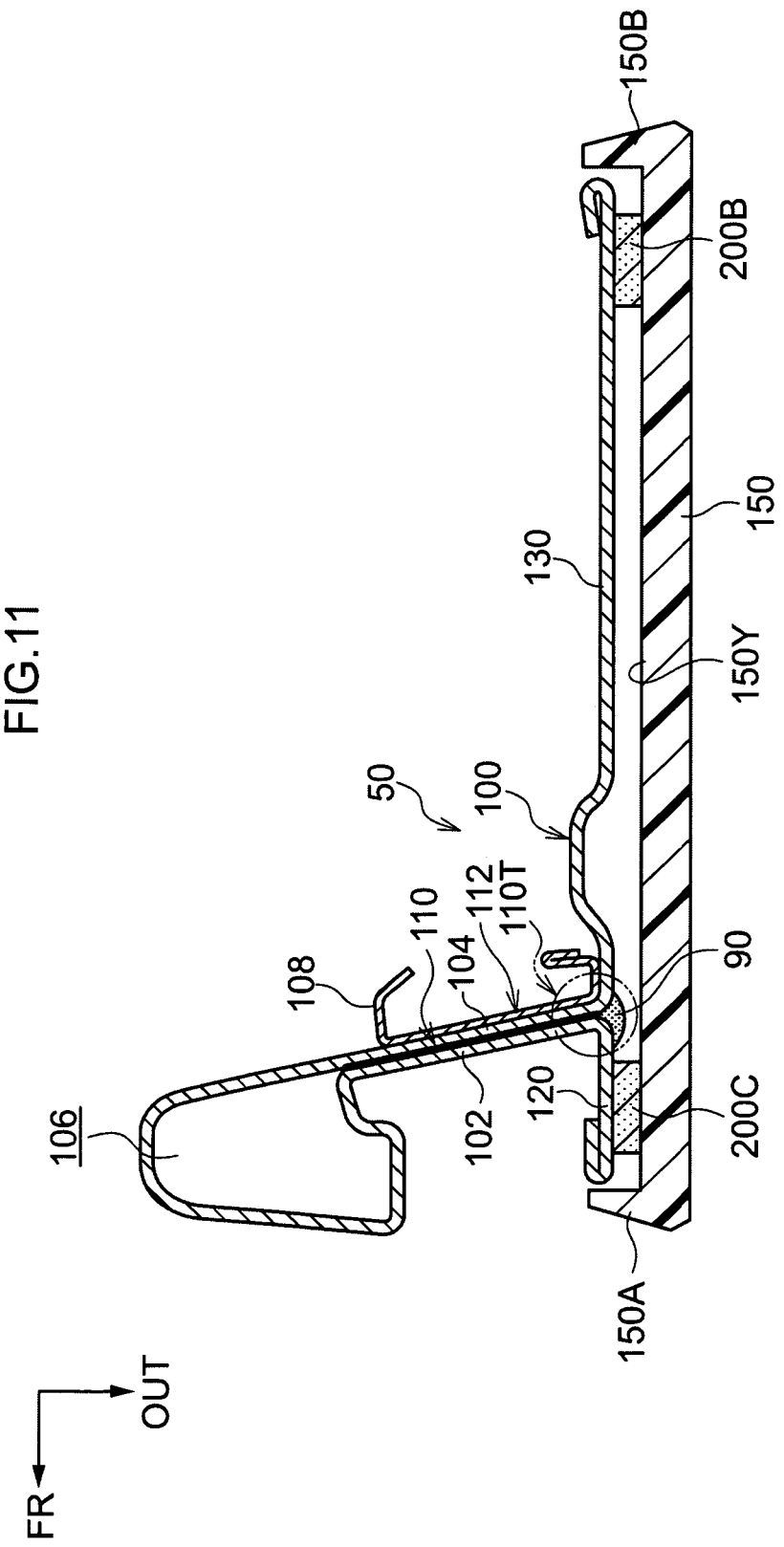
FIG. 11 is a horizontal cross-section of a door frame structure in which water is prevented from penetrating a vehicle width direction end portion of a doubled face-contact portion by a sealer.

Water is thereby prevented from penetrating in from the vehicle width direction outer side end portion 110T of the double-face contact portion 110. In other words, the double-sided adhesive tape 200A doubles as a joining member for fixing the garnish 150 and a waterproofing member for preventing water from penetrating in from the vehicle width direction outer side end portion 110T of the double-face contact portion 110. Accordingly, for example, waterproofing members, such as sealer 90 (see FIG. 11) and sponge 92 (see FIG. 12) or the like, can be dispensed with, and as a result a reduction in cost can be achieved.

Explanation now follows regarding a vehicle door frame structure of a second exemplary embodiment of the present invention.

Sometimes here displacement occurs of the first flange section 120 and the second flange section 130 of the door frame 50 from the first exemplary embodiment in the vehicle width direction due to variation during manufacture. If there is only slight displacement in the vehicle width direction, then this can be accommodated by compression of the double-sided adhesive tape 200A in the thickness direction, with both the first flange section 120 and the second flange section 130 still making contact with and joining to the double-sided adhesive tape 200A.

However, when there is a considerably displacement of the first flange section 120 and the second flange section 130 in the vehicle width direction, then a gap occurs between one of the first flange section 120 or the second flange section 130 and the double-sided adhesive tape 200A (see also a supplementary explanation below).

For example, as shown in FIG. 3A, with the central designed positions of the first flange section 120 and the second flange section 130 at the same vehicle width direction position (in a single plane), variation due to manufacturing in the vehicle width direction of the first flange section 120 and the second flange section 130 from the designed central position is denoted ±A (a displacement width of 2 A).

Figure 3B:
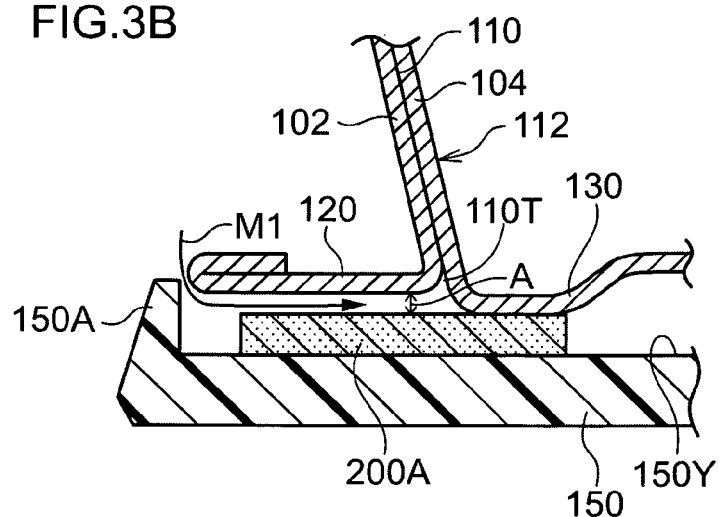
FIG. 3B is a horizontal cross-section of relevant portions of the substantially T-shaped portion in plan view showing a state in which the second flange section is displaced toward the vehicle width direction outer side from its central designed position.

As shown in FIG. 3B, when the second flange section 130 is displaced toward the vehicle width direction outer side from the designed central position (when a step is generated), a gap occurs between the first flange section 120 and the double-sided adhesive tape 200A. Consequently, a path for water entry like that shown by arrow M1 arises, with a risk of water penetrating into the double-face contact portion 110.

Figure 3C:
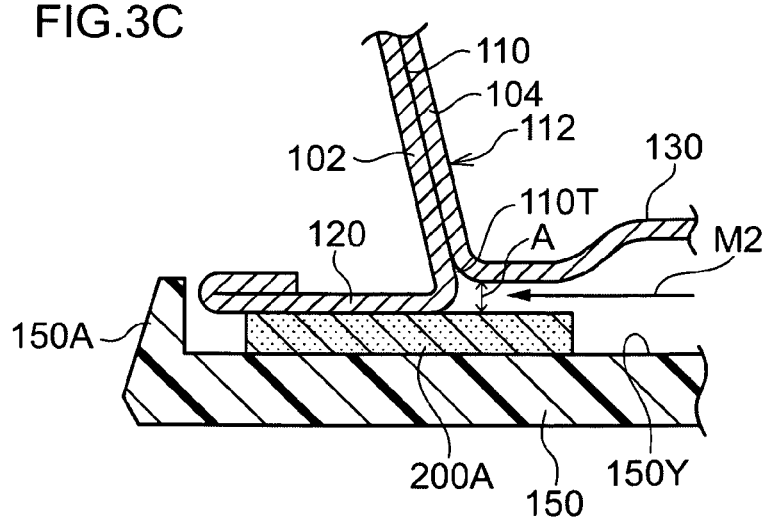
FIG. 3C is a horizontal cross-section of relevant portions of the substantially T-shaped portion in plan view showing a state in which the second flange section is displaced toward the vehicle width direction inner side from its central designed position.

Furthermore, as shown in FIG. 3C, when the second flange section 130 is displaced toward the vehicle width direction inner side from the designed central position (when a step is generated), a gap occurs between the second flange section 130 and the double-sided adhesive tape 200A. Consequently, a path for water entry like that shown by arrow M2 arises, with a risk of water penetrating into the double-face contact portion 110.

Accordingly, in the vehicle door frame structure of the second exemplary embodiment of the present invention, in consideration of displacement due to manufacturing variance of the first flange section 120 and the second flange section 130 in the vehicle width direction from the designed central position, a vehicle door frame structure is configured such that the waterproofing performance of the double-sided adhesive tape 200A is secured even when at least one of the first flange section 120 or the second flange section 130 are displaced from the designed central position in the vehicle width direction due to manufacturing variance.

Explanation follows regarding the second exemplary embodiment of the present invention, with reference to FIG. 4 to FIG. 6. Similar members are allocated the same reference numerals to those of the first exemplary embodiment, and duplicate explanation is omitted.

FIG. 4 shows a horizontal cross-section of a vehicle door frame structure of the second exemplary embodiment (a diagram corresponding to the horizontal cross-section of FIG. 2 taken on line IV-IV of FIG. 1).

Figure 5A:
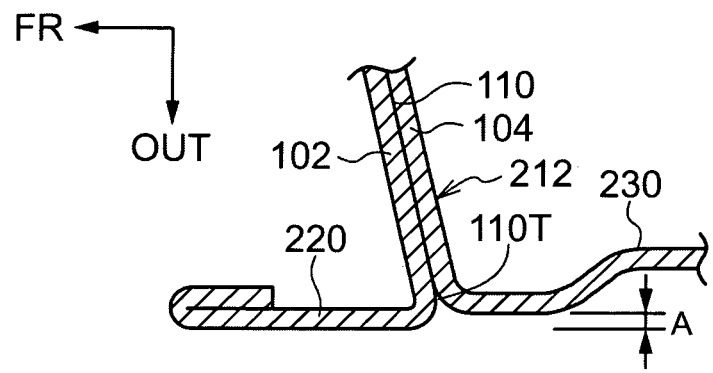
FIG. 5A is a horizontal cross-section of a substantially T-shaped portion in plan view showing a state in which a first flange section and a second flange section are positioned at their central designed positions.
Figure 5B:
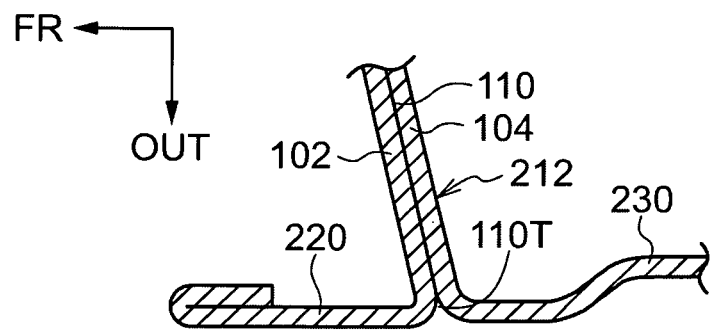
FIG. 5B is a horizontal cross-section of the substantially T-shaped portion in plan view showing a state in which the second flange section is displaced toward the vehicle width direction outer side from its central designed position due to variation during manufacture.
Figure 5C:
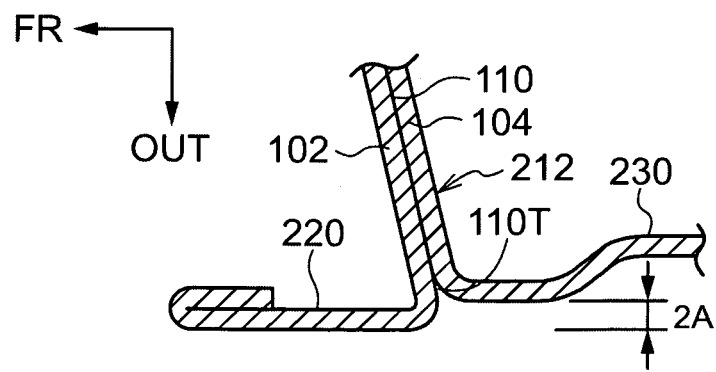
FIG. 5C is a horizontal cross-section of the substantially T-shaped portion in plan view showing a state in which the second flange section is displaced toward the vehicle width direction inner side from its central designed position due to variation during manufacture.

FIG. 5 are explanatory diagrams showing a horizontal cross-section of a T-shaped section 212 to explain cases in which displacement arises in the vehicle width direction due to variation during manufacture. FIG. 5A is a diagram of a case in which a first flange section and a second flange section are provided at their designed central positions. FIG. 5B is a diagram in which the second flange section is displaced toward the vehicle width direction outer side from the designed central position due to variation during manufacture. FIG. 5C is a diagram in which the second flange section is displaced toward the inside in the vehicle width direction from the designed central position due to variation during manufacture.

FIG. 6A is a horizontal cross-section of relevant portions in the second exemplary embodiment, showing a joined state when the second flange section is displaced toward the vehicle width direction outer side from the designed central position due to variation during manufacture. FIG. 6B is a horizontal cross-section of relevant portions in the second exemplary embodiment, showing a joined state when the second flange section is displaced toward the vehicle width direction inner side from the designed central position due to variation during manufacture As shown in FIG. 4, a pillar-side frame structure section 200 of a door frame 60 is configured with a double-face contact portion 110 where a vertical wall portion 102 and a vertical wall portion 104 extending along the vehicle width direction are superimposed on each other and joined together. A first flange section 220 of a vertical wall shape is formed extending towards the vehicle front-side from an edge portion of the vertical wall portion 102 to the vehicle front-side, and a second flange section 230 of a vertical wall shape is formed extending towards the vehicle rear-side from an edge portion of the vertical wall portion 104 to the vehicle front-side. Accordingly, the pillar-side framework portion 100 includes: a substantially T-shaped section 212 in plan view configured by the double-face contact portion 110, the first flange section 220 and the second flange section 230; and a closed-section portion 106.

The second flange section 230 is disposed further displaced toward the vehicle width direction inner side than the first flange section 220 (see FIG. 5A).

A portion at the vehicle front-side and a portion at the vehicle rear-side of a garnish 250 are joined to the first flange section 220 and the second flange section 230 configuring the pillar-side frame structure section 200 by double-sided adhesive tapes 200A, 200B.

The double-sided adhesive tape 200A at the vehicle front-side is provided straddling from the first flange section 220 across to the vehicle front-side end portion of the second flange section 230, so as to cover a vehicle width direction outer side end portion 110T of the double-face contact portion 110 when viewed from the side.

On the back face (vehicle width direction inner side face) 250Y of the garnish 250, in the range in which the double-sided adhesive tape 200A is provided, a projection portion 252 of semicircular shaped cross-section projecting out towards the vehicle width direction inner side is formed at a position facing the second flange section 230 that has been disposed so as to be displaced toward the vehicle width direction inner side. The projection portion 252 extends in the vehicle, top-bottom direction by the same amount as the range over which the double-sided adhesive tape 200A is adhered, or greater.

As stated above, as shown in FIG. 5A, the second flange section 230 is displaced toward the vehicle width direction inner side further than the first flange section 220 (with this displaced state designated as the designed central position (correct dimensions)). The displacement width A set at the maximum value of displacement width of the second flange section 230 from the designed central position of the first flange section 220 and the second flange section 230 in the vehicle width direction due to variation during manufacture (A is the maximum displacement width).

With this setting, as shown in FIG. 5B, when displacement of the second flange section 230 occurs of maximum width A to the vehicle width direction outer side from the designed central position, then the second flange section 230 becomes positioned in the same position as the first flange section 220 (in the same plane). In contrast, as shown in FIG. 5C, when the second flange section 230 is displaced by the maximum width A to the vehicle width direction outer side from the designed central position, then the second flange section 230 is in a displaced state of width A×2 (width 2 A) with respect to the first flange section 220.

Thus, even if variation during manufacture occurs, the second flange section 230 is never positioned further to the vehicle width direction outer side than the first flange section 220. In other words, the second flange section 230 is positioned further to the vehicle width direction inner side than the first flange section 220.

Explanation now follows regarding operation of the present exemplary embodiment.

The second flange section 230 is positioned further to the vehicle width direction inner side than the first flange section 220, however due to the projection portion 252 the second flange section 230 and the double-sided adhesive tape 200A still make contact with each other and create a seal. The surface pressure of the double-sided adhesive tape 200A at the portions corresponding to the projection portion 252 is high, and waterproofing performance is enhanced.

As shown in FIG. 5B, FIG. 6A and FIG. 5C and FIG. 6B, since even when variation during manufacture occurs the second flange section 230 is never positioned further to the vehicle width direction outer side than the first flange section 220, a gap does not arise between the first flange section 220 and the double-sided adhesive tape 200A (see FIG. 3C). Namely, reduction in waterproofing performance caused by displacement of the first flange section 220 and the second flange section 230 in the vehicle width direction due to variation during manufacture is prevented (waterproofing performance is secured).

In order to ensure that the second flange section 230 and the double-sided adhesive tape 200A make contact with each other and create a seal (in order to secure waterproofing performance) using the projection portion 252 as described above, the thickness t of the double-sided adhesive tape (see FIG. 10) needs to be made the maximum displacement width A×2 or greater, and the height of the projection portion 252 needs to be made A×2(2 A) (the thickness of the double-sided adhesive tape needs thicker than the projection portion 252).

However, when the double-sided adhesive tape 200A is adhered to the back face 250Y of the garnish 250, since the outside face of the double-sided adhesive tape 200A is tensioned over the projection portion 252, the thickness of the double-sided adhesive tape 200A over the projection portion 252 becomes slightly thinner. Namely, the thickness of the double-sided adhesive tape 200A over the projection portion 252 becomes t−α. Consequently, by making the height of the projection portion 252 slightly higher, by the amount α that the thickness is thinned, as a height of width A×2(2 A)+α, contact of the second flange section 230 (the projection portion 252) and the double-sided adhesive tape 200A is ensured.

Note, configuration may be made such that the first flange section 220 is displaced further to the vehicle width direction inner side than the second flange section 230. In such cases, the projection portion is formed protruding out towards the vehicle width direction inner side at portions of the back face 250Y of the garnish 250 facing the first flange section 220.

However, while the surface pressure is made higher by forming the projection portion 252, the contact surface area with the double-sided adhesive tape 200A is made narrower (see FIG. 4). Generally the higher the surface pressure the better with respect to waterproofing performance (see the following supplementary explanation), however with respect to bonding ability, since bonding force is physically determined by [bonding force per unit surface area×bonding surface area], the wider the contact surface area (bonding surface area) the better. The two end portions (or the vicinity thereof) of the garnish 250 are preferably firmly fixed.

Accordingly, preferably the bonding ability at the vicinity of the vehicle front-side end 250A of the garnish 250 (see also FIG. 1) is made higher in consideration of fixing the garnish 250. Consequently, as in the present exemplary embodiment, in the range over which the double-sided adhesive tape 200A is provided, preferably the second flange section 230 adjacent to the vehicle front-side end 250A of the garnish 250 is displaced further to the vehicle width direction inner side than the first flange section 220, and the projection portion 252 is formed at portions facing the second flange section 230. In other words, making the contact surface area (bonding surface area) wider by not forming a projection portion at portions facing the first flange section 220 is preferable in consideration of fixing the garnish 250.

Note that the contact surface area (bonding surface area) is secured and joining accomplished by the double-sided adhesive tape 200B in the vicinity of a vehicle rear-side end portion 250B of the garnish 250.

[Supplementary Explanation]

As stated above, when positional displacement of the first flange section 220 and the second flange section 230 in the vehicle width direction (variation) is small, the double-sided adhesive tape 200A is compressed in its thickness direction, and both the first flange section 220 and the second flange section 230 make contact with the double-sided adhesive tape 200A. In other words, it is possible to accommodate positional displacement (variation) of the first flange section 220 and the second flange section 230 in the vehicle width direction by compression of the double-sided adhesive tape 200A in the thickness direction.

However, when there is a large amount of positional displacement (variation) of the first flange section 220 and the second flange section 230 on the vehicle width direction, since the double-sided adhesive tape 200A must be compressed with strong force over a wide surface area, it is difficult to make both the first flange section 220 and the second flange section 230 contact the double-sided adhesive tape 200A. In other words, it is difficult to accommodate positional displacement (variation) of the first flange section 220 and the second flange section 230 in the vehicle width direction by compression of the double-sided adhesive tape 200A in the thickness direction. Consequently, when the positional displacement of the first flange section 220 and the second flange section 230 in the vehicle width direction (variation) is large, as shown in FIG. 3B, FIG. 3C, sometimes one of the first flange section 220 or the second flange section 230 does not make contact with the double-sided adhesive tape 200A.

In order to address this, in the present exemplary embodiment, as stated above, configuration is made such that contact is secured of both the first flange section 220 and the second flange section 230 with the double-sided adhesive tape 200A by disposing the second flange section 230 further to the vehicle width direction inner side than the first flange section 220 and by forming the projection portion 252 at portions facing the second flange section 230.

As shown in FIG. 4 and FIG. 6A, a need arises to press and squash-in the double-sided adhesive tape 200A at portions corresponding to the projection portion 252. In particular, as shown in FIG. 6A, considerably squashing-in is required (a large compression width) when the second flange section 230 is displaced toward the vehicle width direction outer side from the designed central position due to variation during manufacture. However, in such cases, squashing-in need not be performed over a large surface area, and is only required over an extremely narrow surface area corresponding to the projection portion 252. Since surface pressure thereby become high with only light force, the double-sided adhesive tape 200A can be readily squashed-in (compressed).

Accordingly, in the present exemplary embodiment, the double-sided adhesive tape 200A is readily squashed-in (compressed) with light force, due to raising the surface pressure at portions corresponding to the projection portion 252, and waterproofing performance is secured since both the first flange section 220 and the second flange section 230 are in a contact state with the double-sided adhesive tape 200A (achieve a contact state).

The present invention is not limited to the above exemplary embodiments.

Figure 8:
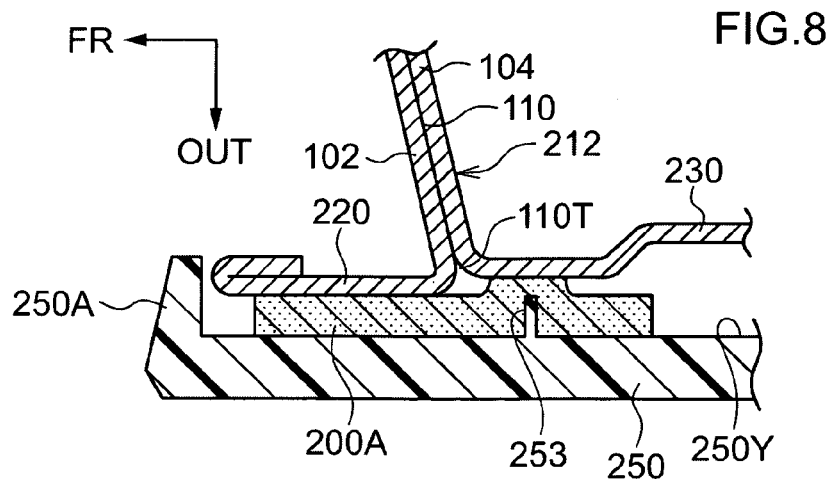
FIG. 8 is a horizontal cross-section showing an example of another shape of protrusion portion.

For example, in the above second exemplary embodiment, while the cross-section of the projection portion 252 was a substantially semi-circular shape, there is no limitation thereto (see FIG. 4). The projection portion 252 may be of any shape. For example, as shown in FIG. 7, a protrusion portion 251 may be employed of substantially triangular cross-section shape, or, as shown in FIG. 8, a protrusion portion 253 of substantially rectangular cross-section may be employed.

Figure 9:
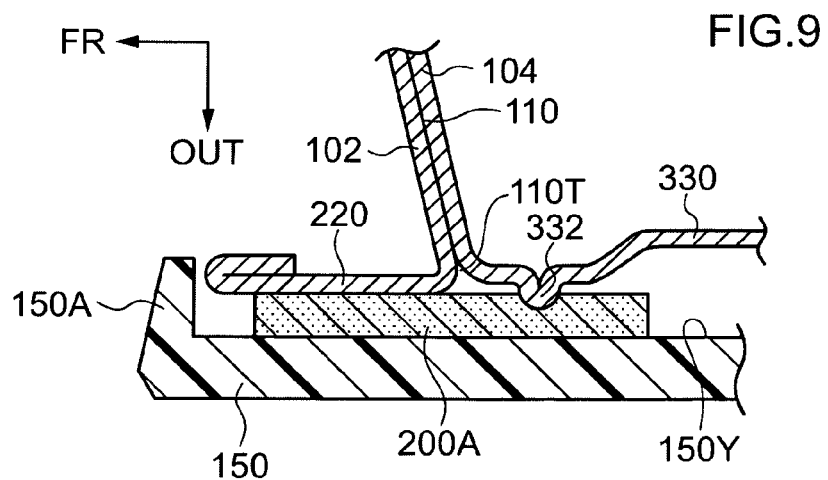
FIG. 9 is a horizontal cross-section showing an example of a protrusion portion formed at the second flange section.

Furthermore, for example, in the above second exemplary embodiment, the projection portion 252 is formed at the garnish 250 (see FIG. 4), however there is no limitation thereto. As shown in FIG. 9, configuration may be made with a protrusion portion 332 formed at a second flange section 330, forming an indentation on the vehicle width direction inner side and protruding out to the vehicle width direction outer side.

Furthermore, for example, in the above first exemplary embodiment, the double-sided adhesive tapes 200A, B are employed as joining members, however there is no particular limitation thereto. For example, configuration may be made in which the garnish is joined (fixed) using an elastic adhesive. In cases employing an elastic adhesive too, either the back face of the garnish, or the first flange section and the second flange section, may be first coated to a specific thickness and then the garnish joined.

Note that even when a small amount of displacement occurs in the vehicle width direction of the first flange section 120 and the second flange section 130 due to variation during manufacture, the elastic adhesive is compressed in its thickness direction, and both the first flange section 120 and the second flange section 130 joined to the garnish 150. However, when there is a large displacement width of the first flange section 120 and the second flange section 130 in the vehicle width direction, configuration as in the second exemplary embodiment, with the second flange section disposed further displaced toward the vehicle width direction inner side than the first flange section, and with a protrusion portion formed at portions facing the second flange section (or to the second flange section), is similarly effective in securing waterproofing performance.

Furthermore, protrusion portions may be provided in plural portions (in a row at intervals along the vehicle front-rear direction). Configuration may also be made with protrusion portions provided to both the back face of the garnish and to the second flange section (and/or the first flange section).

Explanation here in the above first exemplary embodiment and the second exemplary embodiment relates to the pillar-side framework portion 100 of the door frame 50 in the front side door 30 of the vehicle 10, however the present invention can be similarly applied to joining (fixing) a pillar-side framework portion of a door frame of the rear-side door 20 and a garnish 550 (see FIG. 1).

Note that for the rear side door 20 there is symmetry in the vehicle front-rear direction (for each of the figures from FIG. 2 onwards the arrow FR is in the opposite direction). Accordingly, the bonding ability of the vehicle rear-side end portion 550B side (see also FIG. 1) of the garnish 550 also preferably enhanced, when considering fixing the garnish 550. Consequently, in a region where the double-sided adhesive tape 200A (joining member) is provided, preferably the first flange section not adjacent to the vehicle front-side end portion 550A of the garnish 550 is displaced more to the vehicle width direction inner side than the second flange section a projection portion formed. Namely the contact surface area (bonding surface area) is preferably widened by not forming protrusion portions to portions facing the second flange section (or to the second flange section), in consideration of fixing the garnish 550.

Reference numeral 50 is a door frame.
Reference numeral 102 is a vertical wall portion.
Reference numeral 104 is a vertical wall portion.
Reference numeral 110 is a double-face contact portion.
Reference numeral 112 is a substantially T-shaped portion in plan view.
Reference numeral 120 is a first flange section.
Reference numeral 130 is a second flange section.
Reference numeral 150 is a garnish.
Reference numeral 200A is double-sided adhesive tape (joining member).
Reference numeral 202 is a base member.
Reference numeral 204 is an adhesive layer.
Reference numeral 220 is a first flange section.
Reference numeral 230 is a second flange section.
Reference numeral 251 is a protrusion portion (first protrusion portion).
Reference numeral 252 is a protrusion portion (first protrusion portion).
Reference numeral 253 is a protrusion portion (first protrusion portion).
Reference numeral 330 is a second flange section.
Reference numeral 332 is a protrusion portion (second protrusion portion).

The invention claimed is:

1. A vehicle door frame structure comprising:
a door frame including a substantially T-shaped portion in plan view, the T-shaped portion comprising a double-face contact portion at which two vertical wall sections are in surface contact with each other, a first flange section extending towards a vehicle front-side from an edge portion of one of the vertical wall sections at the double-face contact portion, and a second flange extending towards a vehicle rear-side from an edge portion of the other of the vertical wall sections at the double-face contact portion;
a garnish provided at a vehicle width direction outer side of the first flange section and the second flange section of the door frame; and
a joining member joining the garnish to the first flange section and the second flange section, the joining member disposed straddling the first flange section and the second flange section so as to cover a vehicle width direction outer side end portion of the double-face contact portion in side view;
wherein the joining member is double-sided adhesive tape.

2. The vehicle door frame structure of claim 1, wherein in an area provided with the joining member, a first protrusion portion is provided projecting towards a vehicle width direction inner side at at least one of a portion of the garnish facing the first flange section or a portion of the garnish facing the second flange section.

3. The vehicle door frame structure of claim 2, wherein the first flange section and the second flange section are disposed so as to be displaced with respect to each other in a vehicle width direction, and the first protrusion portion is provided at a portion of the garnish facing whichever of the first flange section or the second flange section is displaced toward the vehicle width direction inner side.

4. The vehicle door frame structure of claim 1, wherein in an area provided with the joining member, a second protrusion portion is provided projecting towards the vehicle width direction outer side at at least one of the first flange section or the second flange section.

5. The vehicle door frame structure of claim 4, wherein the first flange section and the second flange section are disposed so as to be displaced with respect to each other in a vehicle width direction, and the second protrusion portion is provided at whichever of the first flange section or the second flange section is disposed so as to be displaced toward the vehicle width direction inner side.

6. The vehicle door frame structure of claim 3, wherein in the area provided with the joining member, whichever of the first flange or the second flange section is not adjacent to a vehicle front-side end portion or a vehicle rear-side end portion of the garnish is displaced toward the vehicle width direction inner side.

7. The vehicle door frame structure of claim 1, further comprising double-sided adhesive tape joining together a vehicle rear-side portion of the second flange section and the garnish.

* * * * *